(12) United States Patent
Coman et al.

(10) Patent No.: US 12,023,573 B2
(45) Date of Patent: *Jul. 2, 2024

(54) PRESENTING BUTTONS FOR CONTROLLING AN APPLICATION

(71) Applicant: Malikie Innovations Limited, Dublin (IE)

(72) Inventors: Tudor Coman, Singapore (SG); William Alexander Cheung, Waterloo (CA); Matthew Nicholaos Staikos, Toronto (CA); Michael Thomas Winkler, Hanover, PA (US); Joshua Rodney Pantony, Calgary (CA)

(73) Assignee: Malikie Innovations Limited, Dublin (IE)

( * ) Notice: Subject to any disclaimer, the term of this patent is extended or adjusted under 35 U.S.C. 154(b) by 74 days.

This patent is subject to a terminal disclaimer.

(21) Appl. No.: 17/132,747

(22) Filed: Dec. 23, 2020

(65) Prior Publication Data

US 2021/0117081 A1  Apr. 22, 2021

Related U.S. Application Data

(63) Continuation of application No. 13/370,553, filed on Feb. 10, 2012, now Pat. No. 10,908,812.

(Continued)

(51) Int. Cl.
*G06F 3/0488* (2022.01)
*A63F 13/2145* (2014.01)
(Continued)

(52) U.S. Cl.
CPC .......... *A63F 13/2145* (2014.09); *A63F 13/22* (2014.09); *G06F 3/04886* (2013.01)

(58) Field of Classification Search
CPC .... G06F 3/04886; G06F 3/0488; A63F 13/22; A63F 13/2145; G09G 5/00
See application file for complete search history.

(56) References Cited

U.S. PATENT DOCUMENTS 6,980,200 B2  12/2005  Goren
7,371,163 B1   5/2008  Best
(Continued)

FOREIGN PATENT DOCUMENTS

DE  102004031659 A1  6/2006
WO    2013085528 A1  6/2013

OTHER PUBLICATIONS

Vbulletin Solutions, Inc.; "[Discuss] Assigning Hardware Keys to Touchscreen Controls!"; Retrieved from: http://forum.xda-developers.com/archive/index.php/t-1087612.html; May 2011; 1 page.

(Continued)

*Primary Examiner* — Olga V Merkoulova
(74) *Attorney, Agent, or Firm* — Conley Rose, P.C.; J. Robert Brown, Jr.

(57) ABSTRACT

Content of an application is presented for display. A virtual controller module receives information relating to keyboard characters for controlling operation of the application. The virtual controller module presents, based on the received information, a first set of buttons for display, where the buttons are to control operation of the application, and where the buttons are mapped to corresponding ones of the keyboard characters.

17 Claims, 5 Drawing Sheets

Related U.S. Application Data (60) Provisional application No. 61/442,088, filed on Feb. 11, 2011.

(51) Int. Cl.
*A63F 13/22* (2014.01)
*G06F 3/04886* (2022.01)

(56) References Cited

U.S. PATENT DOCUMENTS

| | | | | |
|---|---|---|---|---|
| 7,602,378 | B2* | 10/2009 | Kocienda | G06F 3/0238 345/169 |
| 7,646,316 | B2* | 1/2010 | Khoo | G06F 3/04886 345/168 |
| 8,065,344 | B2* | 11/2011 | Mustonen | G06F 16/957 709/239 |
| 9,009,621 | B2* | 4/2015 | Ahn | A63F 13/92 715/702 |
| 10,908,812 | B2 | 2/2021 | Cheung et al. | |
| 11,216,065 | B2* | 1/2022 | VanBlon | G06F 3/013 |
| 2002/0025852 | A1 | 2/2002 | Alcorn et al. | |
| 2003/0129976 | A1 | 7/2003 | Yoshikawa | |
| 2005/0216470 | A1* | 9/2005 | Mustonen | G06F 16/957 |
| 2006/0022053 | A1 | 2/2006 | Hamilton et al. | |
| 2006/0103623 | A1* | 5/2006 | Davis | H04M 1/56 345/156 |
| 2007/0004451 | A1 | 1/2007 | C. Anderson | |
| 2007/0010307 | A1 | 1/2007 | Falciglia, Sr. | |
| 2007/0013673 | A1 | 1/2007 | Minari | |
| 2007/0130529 | A1* | 6/2007 | Shrubsole | G06F 9/451 715/209 |
| 2008/0030476 | A1* | 2/2008 | Raj V.A. | G06F 3/0412 345/173 |
| 2008/0059888 | A1 | 3/2008 | Dunko | |
| 2008/0259039 | A1* | 10/2008 | Kocienda | G06F 3/0238 345/169 |
| 2008/0320418 | A1 | 12/2008 | Huang et al. | |
| 2009/0073004 | A1 | 3/2009 | Lutnick et al. | |
| 2009/0183098 | A1* | 7/2009 | Casparian | G06F 3/0238 341/23 |
| 2009/0227268 | A1 | 9/2009 | Sorensson et al. | |
| 2009/0315852 | A1* | 12/2009 | Kocienda | G06F 3/0238 345/173 |
| 2010/0020033 | A1* | 1/2010 | Nwosu | G06F 3/04886 345/173 |
| 2010/0060585 | A1* | 3/2010 | Chiu | G06F 3/04886 345/173 |
| 2010/0077334 | A1* | 3/2010 | Yang | G06F 16/48 715/825 |
| 2010/0115159 | A1 | 5/2010 | Cookson | |
| 2010/0211809 | A1 | 8/2010 | Shimada | |
| 2010/0287509 | A1 | 11/2010 | Sempek | |
| 2010/0302155 | A1 | 12/2010 | Sands et al. | |
| 2011/0018814 | A1 | 1/2011 | Kruglick | |
| 2011/0037706 | A1 | 2/2011 | Pasquero et al. | |
| 2011/0041056 | A1 | 2/2011 | Griffin et al. | |
| 2011/0043527 | A1* | 2/2011 | Ording | G06F 3/04883 345/428 |
| 2011/0077083 | A1* | 3/2011 | Ahn | A63F 13/92 345/173 |
| 2011/0126094 | A1 | 5/2011 | Horodezky et al. | |
| 2011/0179372 | A1* | 7/2011 | Moore | G06F 3/0237 715/810 |
| 2011/0199325 | A1 | 8/2011 | Payne et al. | |
| 2012/0081305 | A1* | 4/2012 | Schrock | G06F 3/017 345/173 |
| 2012/0146992 | A1 | 6/2012 | Maeta et al. | |
| 2012/0185874 | A1* | 7/2012 | Cookson | H04L 67/10 719/313 |
| 2013/0031515 | A1* | 1/2013 | Funabashi | G06F 3/04886 715/863 |
| 2021/0117081 | A1* | 4/2021 | Coman | A63F 13/22 |

OTHER PUBLICATIONS

Androinica; "Game Gripper will Provide Gaming Keys to Touchscreen Devices via Bluetooth"; Retrieved from: http://androinica.com/2011/02/game-gripper-will-provide-gaming-keys-to-touchscreen-devices-via-bluetooth/; Feb. 16, 2011; 13 pages.

Purdue HCI; "HCI: Issues and Implementation"; Retrieved from: http://purdue-hci.wikidot.com/mehra:article; Feb. 14, 2011; 5 pages.

The UI Observatory; "When Buttons Get in the Way of Touch Screen Gameplay"; Retrieved from: http://uiobservatory.com/2011/when-buttons-get-in-the-way-of-touch-screen-gameplay/; Mar. 4, 2011; 5 pages.

Page, Sebastien; "Sticky Buttons Make your iPhone Touchscreen a Better Control Pad"; Retrieved from: https://www.idownloadblog.com/2010/11/07/sticky-buttons-make-your-iphone-touchscreen-a-better-control-pad/; Nov. 7, 2010; 13 pages.

arcadecontrols.com; "Build You Own Arcade Controls Forum"; Retrieved from: http://forum.arcadecontrols.com/index.php?topic=68994.0; May 31, 2011; 5 pages.

Office Action dated Dec. 31, 2012; U.S. Appl. No. 13/370,553, filed Feb. 10, 2012; 22 pages.

Final Office Action dated Jul. 9, 2013; U.S. Appl. No. 13/370,553, filed Feb. 10, 2012; 21 pages.

Office Action dated Oct. 1, 2014; U.S. Appl. No. 13/370,553, filed Feb. 10, 2012; 20 pages.

Final Office Action dated Apr. 28, 2015; U.S. Appl. No. 13/370,553, filed Feb. 10, 2012; 21 pages.

Advisory Action dated Jul. 29, 2015; U.S. Appl. No. 13/370,553, filed Feb. 10, 2012; 5 pages.

Office Action dated Feb. 11, 2016; U.S. Appl. No. 13/370,553, filed Feb. 10, 2012; 24 pages.

Final Office Action dated Jul. 14, 2016; U.S. Appl. No. 13/370,553, filed Feb. 10, 2012; 22 pages.

Office Action dated Feb. 24, 2017; U.S. Appl. No. 13/370,553, filed Feb. 10, 2012; 22 pages.

Office Action dated Jul. 27, 2017; U.S. Appl. No. 13/370,553, filed Feb. 10, 2012; 25 pages.

Final Office Action dated Jan. 11, 2018; U.S. Appl. No. 13/370,553, filed Feb. 10, 2012; 32 pages.

Office Action dated Jun. 15, 2018; U.S. Appl. No. 13/370,553, filed Feb. 10, 2012; 23 pages.

Office Action dated Dec. 31, 2018; U.S. Appl. No. 13/370,553, filed Feb. 10, 2012; 17 pages.

Office Action dated Jul. 9, 2019; U.S. Appl. No. 13/370,553, filed Feb. 10, 2012; 17 pages.

Office Action dated Feb. 10, 2020; U.S. Appl. No. 13/370,553, filed Feb. 10, 2012; 24 pages.

Final Office Action dated Aug. 4, 2020; U.S. Appl. No. 13/370,553, filed Feb. 10, 2012; 8 pages.

Notice of Allowance dated Oct. 8, 2020; U.S. Appl. No. 13/370,553, filed Feb. 10, 2012; 9 pages.

Canadian Office Action; Application No. 2,767,579; Jan. 10, 2014; 3 pages.

Canadian Office Action; Application No. 2,767,579; Dec. 10, 2014; 4 pages.

Canadian Office Action; Application No. 2,767,579; Nov. 27, 2015; 4 pages.

Canadian Office Action; Application No. 2,767,579; Nov. 15, 2016; 4 pages.

Canadian Office Action; Application No. 2,767,579; Nov. 1, 2017; 5 pages.

Canadian Office Action; Application No. 2,767,579; Oct. 22, 2018; 5 pages.

Canadian Office Action; Application No. 2,767,579; Sep. 25, 2019; 4 pages.

European Extended Search Report; Application No. 12153731.0; Sep. 7, 2017; 8 pages.

European Examination Report; Application No. 12153731.0; Oct. 9, 2020; 7 pages.

\* cited by examiner

PRESENTING BUTTONS FOR CONTROLLING AN APPLICATION

CROSS-REFERENCE TO RELATED APPLICATION

This application is a continuation of U.S. patent application Ser. No. 13/370,553 filed Feb. 10, 2012 by William Alexander Cheung, et al. entitled, "Presenting Buttons for Controlling an Application", which claims priority to U.S. Provisional Application No. 61/442,088, entitled "PRESENTING BUTTONS FOR CONTROLLING AN APPLICATION," filed Feb. 11, 2011, both of which are hereby incorporated by reference

BACKGROUND

Execution of an application in an electronic device (such as a tablet computer, personal digital assistant, mobile telephone, notebook computer, and so forth) can cause display of content in a display screen of the electronic device. The displayed content can be interactive content, in which a user is able to provide user input to interact with the respective application. For example, the application can be a game application that provides electronic game content. Some game applications are designed to work with devices that have physical keyboards, where particular keys of the physical keyboards are used to control user interaction with the game applications. With such a game application, a user can use a physical keyboard of an electronic device to interact with the game application, or alternatively, the user can use a pop-up virtual keyboard that can be displayed in the screen of the electronic device. However, a user may find having to use a physical keyboard or a pop-up virtual keyboard inconvenient.

BRIEF DESCRIPTION OF THE DRAWINGS

Some embodiments are described with respect to the following figures.

DETAILED DESCRIPTION

An application that is designed to operate in computers (such as desktop or notebook computers) having physical keyboards can specify that selected ones of the keys of a keyboard are useable by a user to interact with the application. A "keyboard" generally refers to a user input device that has alphanumeric keys (including alphabetic keys and number keys) and possibly other keys, such as symbol keys, function keys, and so forth.

Traditionally, for a user to interact with such an application, the user would use a physical keyboard (if available) of an electronic device, or use a pop-up virtual keyboard that occupies a portion of a display screen of the electronic device. Using either a physical keyboard or a pop-up virtual keyboard can degrade user experience in some cases. The physical keyboard on certain types of electronic devices, such as personal digital assistants (PDAs) and mobile telephones, can be relatively small, and can be difficult to use, particularly when the application is a game application and the user has to engage in a succession of quick inputs when playing a game. A pop-up virtual keyboard can occupy a substantial amount of the real estate of a display screen of the device, which can reduce the amount of space available for displaying content of the application.

In accordance with some embodiments, mechanisms or techniques are provided to allow for display of selected virtual buttons for controlling operation of the application. By displaying the selected virtual buttons to allow a user to control operation of the application, a physical keyboard or a pop-up virtual keyboard does not have to be used. In fact, physical keyboards may not be provided in some electronic devices.

The selected virtual buttons are displayed with the application content in a touch-sensitive display screen of an electronic device. The displayed virtual buttons can be considered to be part of a virtual input pad, and the displayed virtual buttons are actuatable by user touches of respective areas of the touch-sensitive display screen to control operation of the application, such as to perform user interaction with the application.

By displaying just selected virtual buttons, a smaller amount of real estate of the display screen is occupied by the virtual input pad as compared to traditional mechanisms that present pop-up virtual keyboards. In accordance with some embodiments, the virtual buttons for a given application that are displayed are those virtual buttons that are designated to control the operation of the given application. These virtual buttons can be displayed without displaying keys of a virtual keyboard that are not used for controlling the operation of the given application. In addition to occupying less space in the display screen than a virtual keyboard, the virtual buttons may also provide improved ergonomics for a user.

The mechanisms or techniques according to some embodiments for displaying virtual buttons for controlling operation of an application can cause the virtual buttons to overlay corresponding collocated portions of the displayed content of the application. Virtual buttons "overlay" collocated portions of the content of an application in a display screen when the virtual buttons are displayed concurrently with the application content, and the virtual buttons are visible to a user and appear to be over the respective portions of the application content, where each such respective portion of the application content is visible around the corresponding overlaid virtual button. In alternative embodiments, the virtual buttons can be displayed in a region of the display screen separate from the displayed application content.

In some embodiments, an application whose content can be displayed is a "rich Internet application," which is a web application capable of presenting interactive multimedia content (including video, audio, and/or other types of content) that allows for user interaction with the multimedia content, where the web application can be executed by a web browser, executed as a plug-in to the web browser, executed using a sandbox (which is a security mechanism to isolate a running program such as an applet), or executed with a virtual machine (which is a virtualized partition of a physical machine). Examples of rich Internet applications include Flash applications (applications run on a platform provided by Adobe Flash®), applications according to HTML5 (Hypertext Markup Language 5), Java applications, applications according to Microsoft Silverlight®, or other types of rich Internet applications.

An application that is executed by a web browser or that is executed as a plug-in to the web browser is referred to as a "browser-based application." A browser-based application is distinguished from software applications that do not execute in a browser. A "web browser" (sometimes referred to as an "Internet browser" or more simply a "browser") refers to an application for retrieving and presenting content available over a network, such as the worldwide web or a private network within an enterprise (e.g., company, educational organization, government agency, etc.). Content of a browser-based application, such as a game application, is displayed by a web browser that executes in an electronic device.

In the ensuing discussion, reference is made to game applications. However, it is noted that mechanisms or techniques according to some implementations can also be used with other types of rich Internet applications.

A game application has certain game control functions, such as ↑, ↓, ←, and → (up, down, left, and right arrow) functions. A first game application can specify that the foregoing game control functions are to be provided by certain input characters, such as keyboard characters (e.g., "E," "D," "S," and "F," respectively). In other words, in this example, if a physical keyboard were present, a user pressing the "E" key would provide the ↑ function, a user pressing the "D" key would provide the ↓ function, and so forth. A second game application can specify that the foregoing game control functions are implemented with a different set of keyboard characters, such as "W," "S," "A," and "D." Moreover, other game applications can have other types of game control functions, or additional game control functions, that are to be implemented with different input characters, such as keyboard characters.

More generally, game control functions can vary from game application to game application, and mappings of game control functions to keyboard characters (designated to provide the respective functions) can also vary from game application to game application. In the ensuing discussion, reference is made to mapping game control functions (and respective virtual buttons) to keyboard characters.

By displaying virtual buttons that are mapped to respective keyboard characters for controlling operation of a game application, a user of an electronic device would not have to use a physical keyboard or a pop-up virtual keyboard. In fact, the electronic device may be configured without a physical keyboard.

In accordance with some embodiments, a virtual controller module is provided to cause display of a virtual game controller pad (or other type of virtual input pad) that has selected virtual buttons (which provide respective game control functions) actuatable to interact with a game application. The virtual controller module is able to map the displayed virtual buttons to respective keyboard characters that are designated to provide the game control functions of a particular game application. The mapping of virtual buttons (which correspond to respective game control functions) to respective keyboard characters is performed in a dynamic and customizable manner.

Thus, if a user is playing a first game application that specifies that game control functions are implemented with a first set of keyboard characters, then the virtual controller module according to some embodiments maps the virtual buttons (for the respective game control functions) to the first set of keyboard characters. On the other hand, when the user, at a different time, decides to play a second game application that implements game control functions with a second, different set of keyboard characters, the virtual controller module according to some embodiments maps the virtual buttons to the second set of keyboard characters.

Touch events relating to the virtual buttons (due to a user touching areas of the touch-sensitive display screen corresponding to the virtual buttons) effectively simulate events relating to actuation of corresponding keys of a physical keyboard.

Figure 1A:
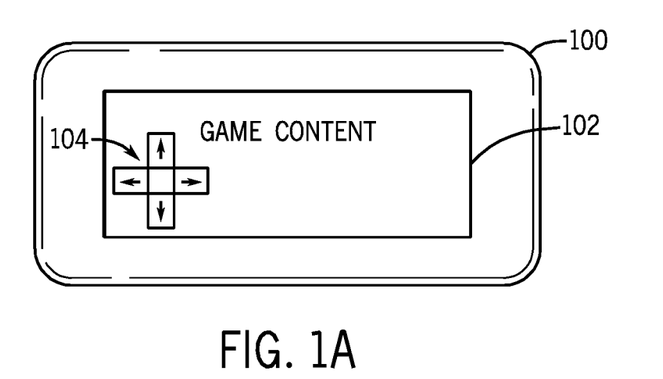
FIGS. 1A-1B illustrate example graphical content displayable in a display screen, where the graphical content includes virtual buttons according to some embodiments.

FIG. 1A depicts a touch-sensitive display screen 102 of an electronic device 100 to display graphical content. In some implementations, the electronic device 100 is a tablet computer. In other implementations, the electronic device 100 can be a personal digital assistant (PDA), mobile telephone, computer (desktop or notebook computer), or any other electronic device that has a touch-sensitive display screen. The display screen 102 is able to display game content associated with a game application. The game content is caused to be displayed by a web browser of the electronic device 100 when the game application is executed by the web browser. The touch-sensitive display screen 102 allows a user to touch different parts of the screen 102 to request actions to be performed.

Additionally, game control virtual buttons 104 (which form a virtual game controller pad) are also displayed as an overlay over the game content. In the example of FIG. 1A, the displayed virtual buttons are ↑, ↓, ←, and → virtual buttons, which can be mapped (in a specific example) to the following respective keyboard characters designated to provide corresponding game control functions: "W," "S," "A," and "D". A user can touch different ones of the virtual buttons 104 on the touch-sensitive display screen 102 to perform different game control actions.

Although FIG. 1A shows the game control virtual buttons 104 overlaying collocated portions of the game content in the display screen 102, in other examples the game content can be displayed in a first region of the display screen 102, while the game control virtual buttons 104 are displayed in a second, separate region of the display screen 102, such that the game control virtual buttons 104 do not overlay the game content or that a portion of the game control virtual buttons 104 overlay a portion of the game content.

Figure 1B:
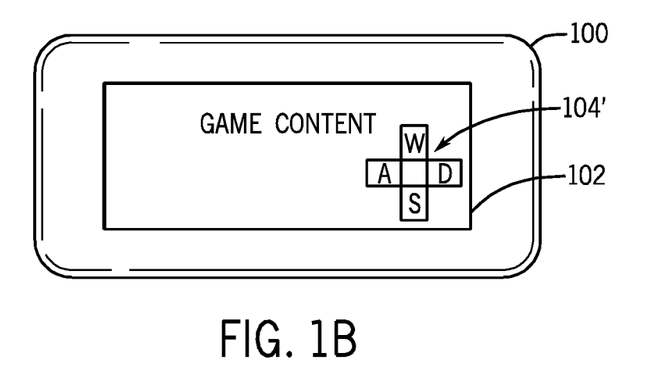

FIG. 1B depicts a different example, in which the display screen 102 of the electronic device 100 shows "W," "S," "A," and "D" virtual buttons 104'. The "W," "S," "A," and "D" virtual buttons 104' are equivalent to the ↑, ↓, ←, and → virtual buttons of FIG. 1A, in that they provide the same respective game control functions. Note that the "W," "S," "A," and "D" virtual buttons 104' in this example are mapped to the same set of keyboard characters: "W," "S," "A," and "D". FIGS. 1A and 1B are shown to indicate that the virtual buttons displayed can have different labels even though they provide the same game control functions and are mapped to the same set of keyboard characters.

As depicted in each of FIGS. 1A and 1B, rather than displaying an entire pop-up virtual keyboard, selected game control buttons 104, 104' are displayed. As a result, a smaller amount of real estate of the display screen 102 is used to display the game controller pad, as compared to mechanisms that display a pop-up virtual keyboard.

Figure 2:
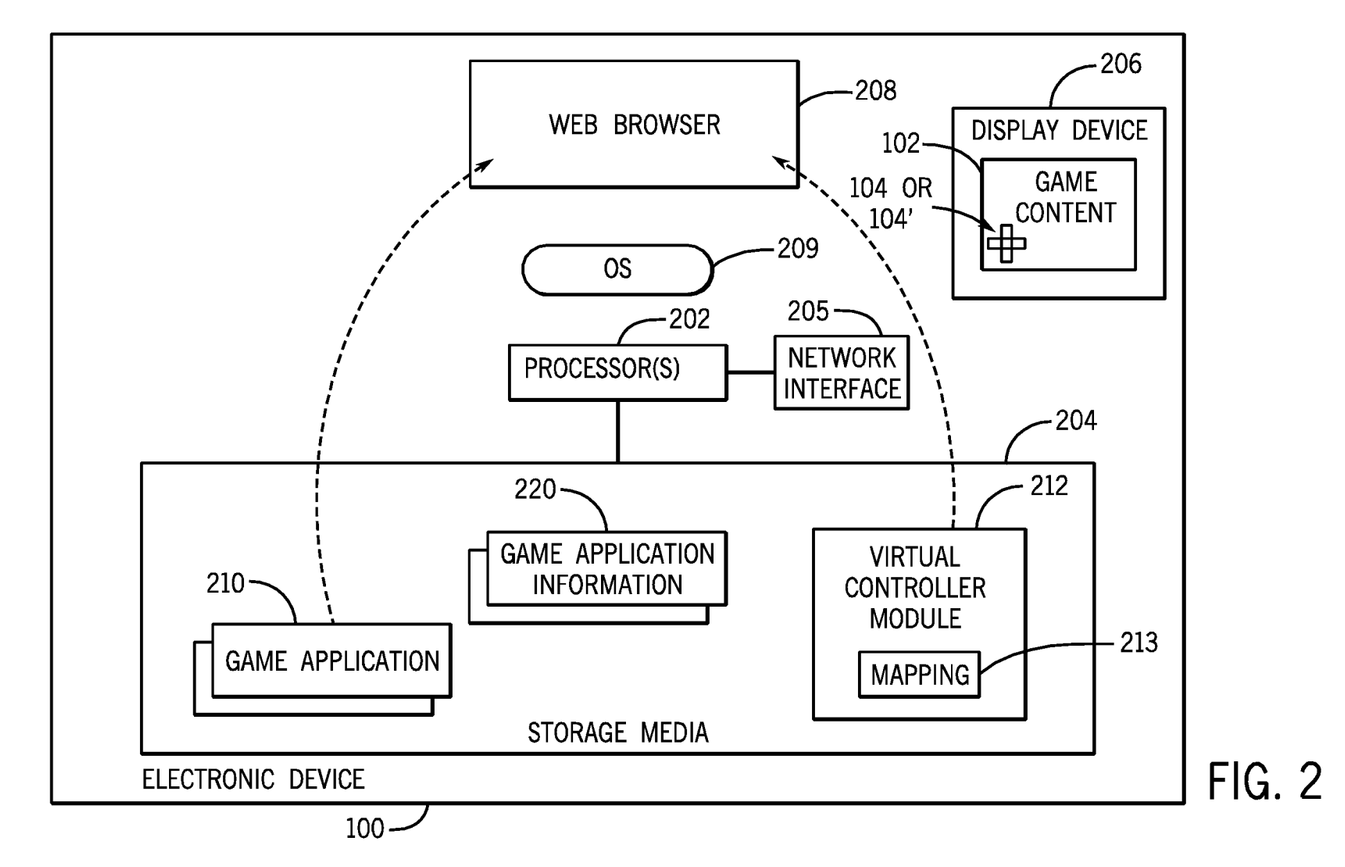
FIG. 2 is a block diagram of an example electronic device incorporating some embodiments.

FIG. 2 illustrates example components of the electronic device 100. Note that FIG. 2 is provided to depict one example arrangement. In other examples, other arrangements of components of the electronic device 100 can be provided.

In FIG. 2, the electronic device 100 includes a processor (or multiple processors) 202, which is connected to storage media 204. The storage media 204 can be implemented with one or multiple storage devices, such as disk-based storage device(s), semiconductor storage device(s), or another type of storage device(s). The processor(s) 202 is (are) connected to a network interface 205 to allow the electronic device 100 to communicate over a network with a remote entity.

The electronic device 100 also includes a display device 206 that has the touch-sensitive display screen 102 in which graphical content including game content and game control virtual buttons 104 or 104' can be displayed.

In addition, the electronic device 100 has a web browser 208 that is executable on the processor(s) 202. The web browser 208 can retrieve and display various content, including content associated with a game application 210 that can also execute on the processor(s) 202, in response to user request. When the game application 210 is launched, the game application 210 is run in the web browser 208. In FIG. 2, multiple game applications 210 are depicted, where the game applications 210 can be selectively invoked by a user of the electronic device 100.

FIG. 2 also depicts an operating system 209 of the electronic device 100. The operating system 209 manages execution of applications and hardware resources of the electronic device 100.

In accordance with some embodiments, a virtual controller module 212 can also be invoked for displaying the game control virtual buttons, such as 104 or 104' in FIG. 1A or 1B. When invoked, the virtual controller module 212 also executes in the web browser 208. In some examples, the virtual controller module 212 can be implemented with a scripting language (such as JavaScript) or with a native code language. The virtual controller module 212 is separate from the game applications 210, and can also be separate from the operating system 209 of the electronic device 100.

The mapping between game control virtual buttons and keyboard characters can be based on information 220 associated with each of the game applications 210. The information 220 associated with each game application 210 can be provided by the game application 210, or can be obtained from another source. The game application information 220 provides indications of which keyboard characters are designated to implement game control functions for each respective game application 210.

The mapping between game control virtual buttons and keyboard characters can be performed in a number of different ways. For example, when a particular game application 210 is launched to execute in the web browser 208 (such as in response to a user clicking on a link in content displayed by the web browser 208), the web browser 208 may provide a prompt to the user indicating that to control the particular game application 210, a certain set of keyboard characters (e.g., "A," "S," "W," and "D") are to be used. The web browser 208 can provide this prompt based on the respective game application information 220. In response to the prompt, the user can launch the virtual controller module 212, and the user (using the virtual controller module 212) can map game control virtual buttons (of a virtual controller pad) to the set of keyboard characters.

The mapping between game control virtual buttons and keyboard characters may be provided in mapping information 213 maintained by the virtual controller module 212.

In some examples, the user can also customize the layout of the virtual controller pad. The layout refers to positioning of the virtual buttons in a display screen, as well as sizes of the virtual buttons.

In alternative implementations, user intervention for performing mapping of game control functions to keyboard characters does not have to occur. Instead, either the web browser 208 or the virtual controller module 212 is able to access the game application information 220 for the particular game application 210 to automatically determine which keyboard characters are to be used to provide respective game control functions.

For example, the game application information 220 can include metadata or tags that define a configuration that includes a mapping of game control functions to respective keyboard characters. Using the metadata or tags, the virtual controller module 212 or web browser can automatically map game control virtual buttons (corresponding to the game control functions) to respective ones of the identified keyboard characters.

In some implementations, an application programming interface (API) or other type of interface can be made available to game developers (developers of game applications). The API or other interface allows a game developer (of a particular game application) to define a configuration of the virtual controller pad (including selected virtual buttons) for the particular game application. The configuration of the virtual controller pad includes the mapping between the virtual buttons and respective keyboard characters. The game developer can also use the API or other interface to define a layout of the virtual buttons in the virtual controller pad. The layout refers to positioning of the virtual buttons in a display screen, as well as sizes of the virtual buttons. The configuration and layout can be provided in metadata or tags, and can be provided as part of the game application information 220 for the particular game application.

As yet another alternative, the web browser 208, or some other component in the electronic device 100, can be configured with intelligence to determine dynamic mappings of game control functions of game applications to keyboard characters. For example, the web browser 208 or some other component can go to a remote site, such as a website for a given game application, to retrieve mapping information to allow for the dynamic mapping of game control virtual buttons to keyboard characters.

Figure 3:
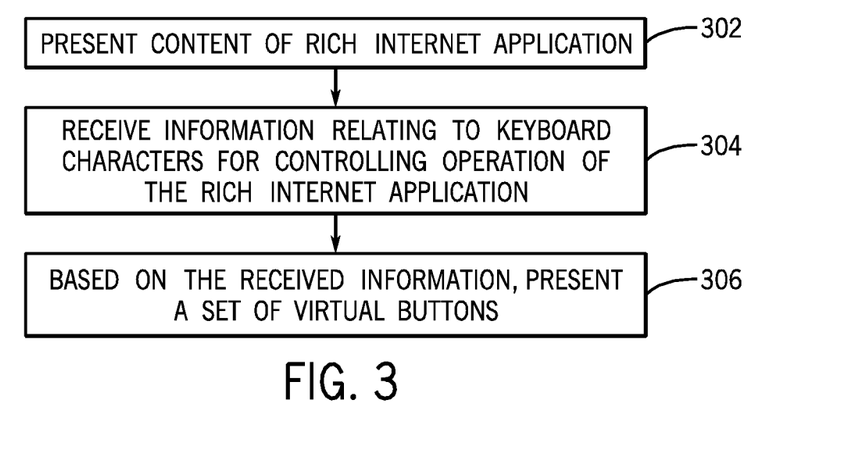
FIGS. 3 and 4 are flow diagrams of processes of presenting virtual buttons for controlling an application, according to various embodiments.

FIG. 3 is a flow diagram of a process according to some embodiments. Content of a rich Internet application is presented (at 302) in an electronic device, where "presenting" the content refers to displaying the content, causing display of the content, or outputting the content to another device for display. Information relating to keyboard characters for controlling operation of the rich Internet application is received (at 304). Based on the received information, the virtual controller module presents (at 306) a set of virtual buttons, wherein the set of virtual buttons are for controlling operation of the rich Internet application, and where the set of virtual buttons are mapped to the input characters.

Figure 4:
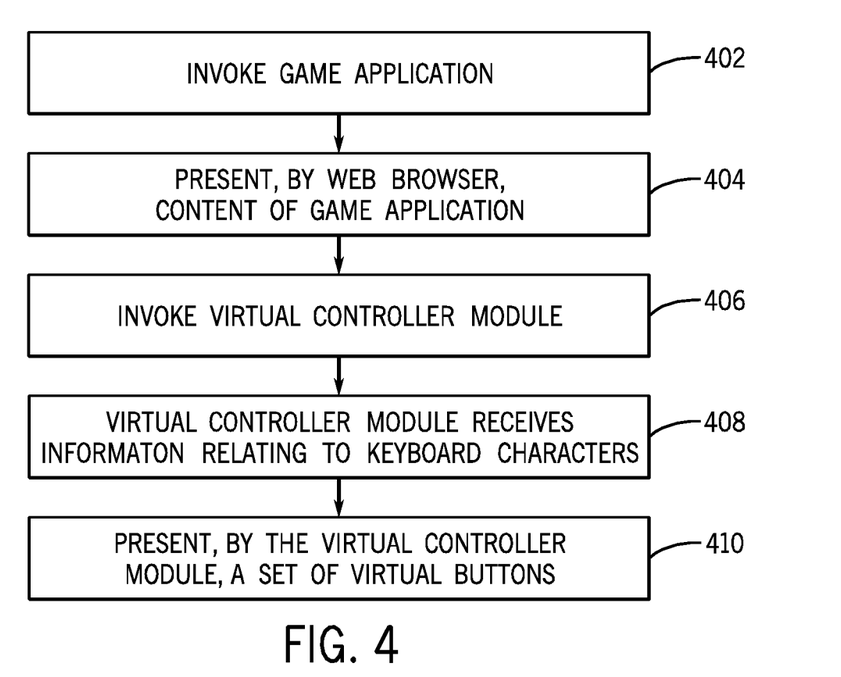

FIG. 4 is a flow diagram of a process according to alternative embodiments. A game application is invoked (at 402) in the electronic device 100, which causes the game application to be executed by the web browser 208 (FIG. 2) of the electronic device 100. The web browser 208 presents (at 404) content of the game application for display in the touch-sensitive display screen 102.

Additionally, the virtual controller module 212 is invoked (at 406), where invocation of the virtual controller module 212 can be performed in response to user request or automatically. The virtual controller module 212 receives (at 408) information relating to keyboard characters for controlling operation of the game application. Based on the received information, the virtual controller module 212 presents (at 410) a set of virtual buttons (that form a virtual controller pad) for display. The set of virtual buttons are mapped to corresponding ones of the keyboard characters identified by the received information.

Figure 5:
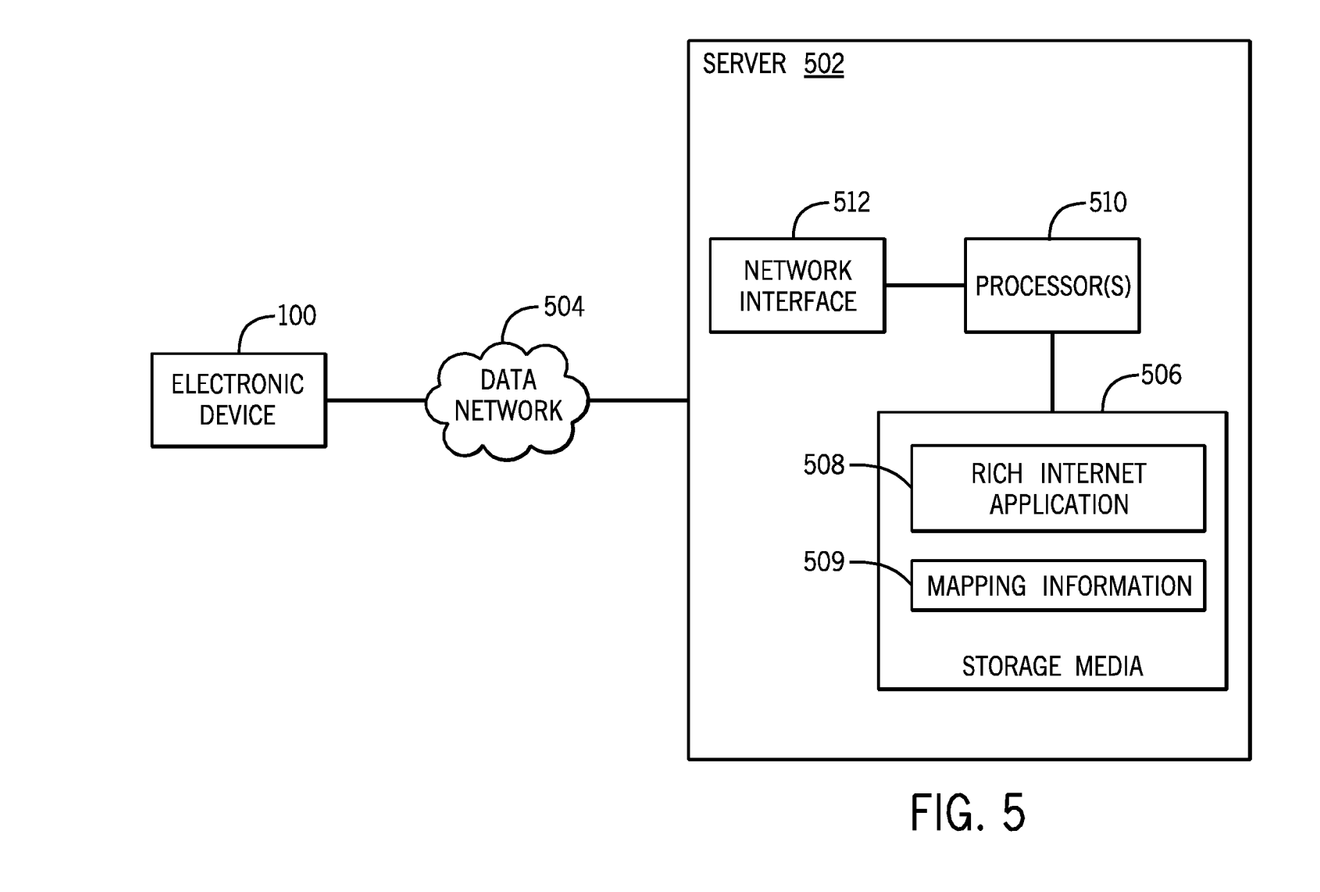
FIG. 5 is a block diagram of an example arrangement including an electronic device and a server having a rich Internet application and mapping information that can be downloaded to the electronic device, in accordance with some embodiments.

FIG. 5 depicts an example arrangement including the electronic device 100 and a server 502. The electronic device 100 is able to communicate with the server 502 over a network 504 (e.g., the worldwide web or a private network). The server 502 includes a storage media 506 that stores a rich Internet application 508 (e.g. a game application) that can be retrieved by the electronic device 100 for loading into the electronic device 100. In accordance with some embodiments, the storage media 506 can also store mapping information 509, which can be in the form of metadata or tags discussed above for defining a configuration (and possibly layout) of virtual buttons (for controlling operation of the rich Internet application 508). Although just one rich Internet application 508 and corresponding mapping information 509 is depicted in FIG. 5, note that the server 502 can store multiple rich Internet applications and respective mapping information in other examples.

The server 502 includes a processor (or multiple processors) 510, and a network interface 512 to allow the server 502 to communicate over the network 504. Although just one electronic device 100 is depicted in FIG. 5, multiple electronic modules can access the server 502 over the network 504.

Figure 6:
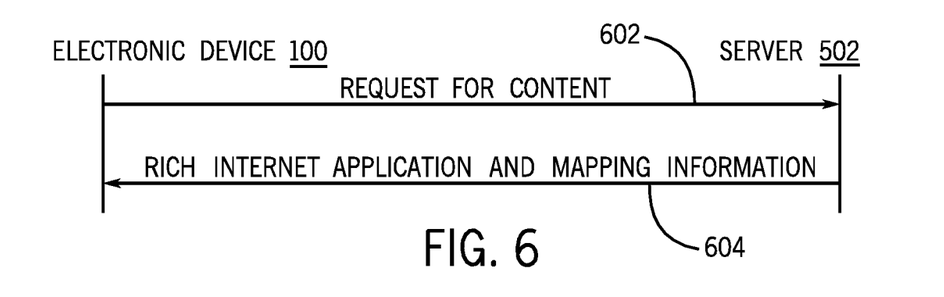
FIG. 6 is a message flow diagram of information exchanged between an electronic device and a server, according to some embodiments.

FIG. 6 is a message flow diagram of information exchanged between the electronic device 100 and the server 502. The electronic device 100 sends a request (602) for content to the server 502. The request (602) for content can include an indication (such as a uniform resource locator or other identifier) specifying that the content is to be provided by the rich Internet application 508. In response to the request, the electronic device 100 receives, from the server 502, information (604) including the rich Internet application 508, and optionally the mapping information 509. In some embodiments, the electronic device 100 may already have sufficient information to allow for mapping between control functions and keyboard characters, in which case the mapping information 509 would not have to be provided. In other embodiments, the mapping information 509 is provided along with the rich Internet application 508. For example, the rich Internet application 508 and mapping information 509 can be part of a document such as an HTML document, or other data structure. Alternatively, the rich Internet application 508 and mapping information 509 can be provided separately.

Figure 7:
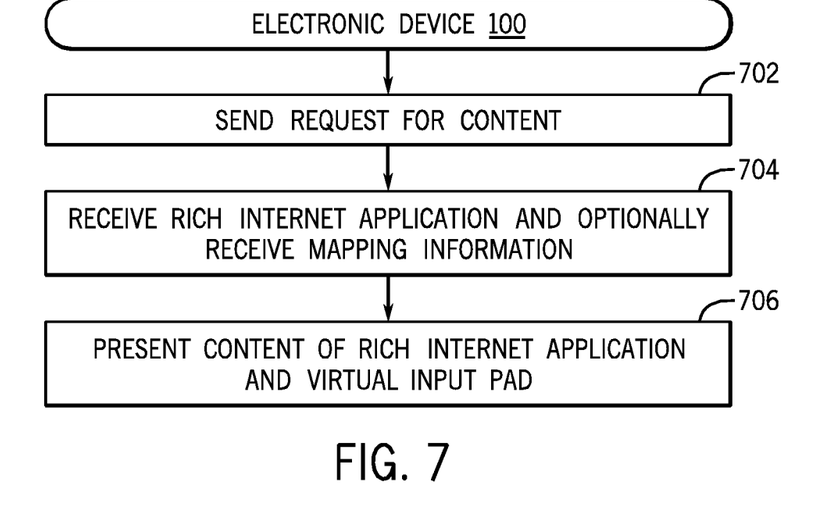
FIG. 7 is a flow diagram of a process of an electronic device according to further embodiments.

FIG. 7 is a flow diagram of a process according to further embodiments performed by the electronic device 100. The electronic device 100 sends (at 702), to the server 502, a request for content (which corresponds to the rich Internet application 508 at the server 502). Next, the electronic device 100 receives (at 704) data responsive to the request, where the received data includes the rich Internet application 508, and optionally the mapping information 509. The electronic device 100 then presents (at 706) the content of the rich Internet application and the virtual input pad (containing virtual buttons for controlling the rich Internet application).

Figure 8:
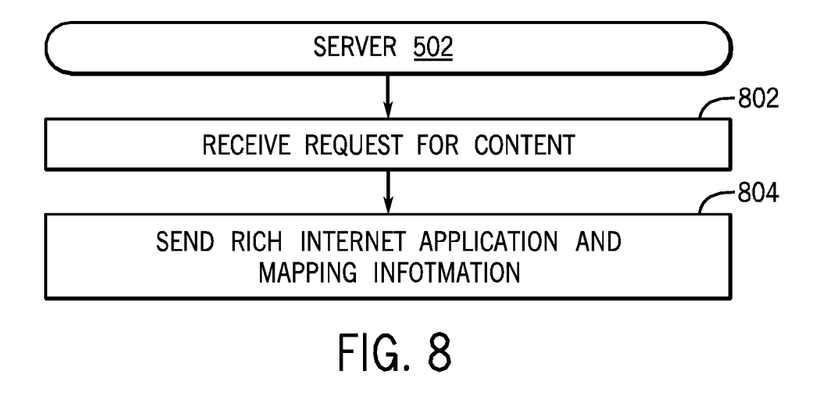
FIG. 8 is a flow diagram of a process of a server according to additional embodiments.

FIG. 8 is a flow diagram of a process according to additional embodiments performed by the server 502. The server 502 receives (at 802), from the electronic device 100, a request for content, which corresponds to the rich Internet application 508. In response to the request, the server 502 sends (at 804) the rich Internet application 508 and the mapping information 509 to the electronic device 100.

Machine-readable instructions of various modules described above (including 208, 209, 210, and 212 of FIG. 2) are loaded for execution on a processor or multiple processors (such as 202 in FIG. 2). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method implemented by an electronic device, the method comprising:

obtaining application information associated with an application stored on the electronic device, the application information comprised in metadata received at the electronic device from a same remote source as the application;

launching the application at the electronic device in a web browser;

prompting, based on the application information, user input;

launching, in response to the user input, a virtual controller at the electronic device in the web browser;

mapping, using the virtual controller based on the user input, control functions of the application to a subset of keyboard characters, wherein the subset of keyboard characters comprises fewer than all of a plurality of keyboard characters of a virtual keyboard;

storing, by the virtual controller, the mapping of the control functions;

rendering and displaying, by a display screen of the electronic device, the subset of keyboard characters based on the mapping; and controlling operation of the application in response to actuation of the subset of keyboard characters.

2. The method of claim 1, wherein the display screen is a touch sensitive display.

3. The method of claim 1, wherein the subset of keyboard characters is rendered and displayed in an arrangement corresponding to an arrangement of the keyboard characters in a physical keyboard.

4. The method of claim 1, wherein a layout of the subset of keyboard characters on the display screen is customizable.

5. The method of claim 1, wherein the application is a plug-in application for the web browser.

6. The method of claim 1, wherein launching the application on the electronic device occurs prior to obtaining the application information.

7. The method of claim 1, wherein the application information is obtained from a remote site over a network.

8. An electronic device, comprising:

at least one processor; and a display device having a touch-sensitive display screen, the at least one processor being configured to:

obtain application information associated with an application stored on the electronic device, the application information comprised in metadata received at the electronic device from a same remote source as the application;

launch the application at the electronic device in a web browser;

prompt, based on the application information, user input;

launch, in response to the user input, a virtual controller at the electronic device in the web browser;

map, using the virtual controller based on the user input, control functions of the application to a subset of keyboard characters, wherein the subset of keyboard characters comprises fewer than all of a plurality of keyboard characters of a virtual keyboard;

store, by the virtual controller, the mapping of the control functions;

render and display the subset of keyboard characters based on the mapping; and control operation of the application in response to actuation of the subset of keyboard characters.

9. The electronic device of claim 8, wherein the subset of keyboard characters is rendered and displayed in an arrangement corresponding to an arrangement of the keyboard characters in a physical keyboard.

10. The electronic device of claim 8, wherein a layout of the subset of keyboard characters on the display screen is customizable.

11. The electronic device of claim 8, wherein the application is a plug-in application for the web browser.

12. The electronic device of claim 8, wherein the at least one processor is further configured to launch the application on the electronic device prior to obtaining the application information.

13. A non-transitory computer-readable medium storing code which, when executed by a processor of an electronic device, causes the electronic device to implement:

obtaining application information associated with an application stored on the electronic device, the application information comprised in metadata received at the electronic device from a same remote source as the application;

launching the application at the electronic device in a web browser;

prompting, based on the application information, user input;

launching, in response to the user input, a virtual controller at the electronic device in the web browser;

mapping, using the virtual controller based on the user input, control functions of the application to a subset of keyboard characters, wherein the subset of keyboard characters comprises fewer than all of a plurality of keyboard characters of a virtual keyboard;

storing, by the virtual controller, the mapping of the control functions;

rendering and displaying, by a display screen of the electronic device, the subset of keyboard characters based on the mapping; and controlling operation of the application in response to actuation of the subset of keyboard characters.

14. The non-transitory computer-readable medium of claim 13, wherein the subset of keyboard characters is rendered and displayed in an arrangement corresponding to an arrangement of the keyboard characters in a physical keyboard.

15. The non-transitory computer-readable medium of claim 13, wherein a layout of the subset of keyboard characters on the display screen is customizable.

16. The non-transitory computer-readable medium of claim 13, wherein the application is a plug-in application for the web browser.

17. The non-transitory computer-readable medium of claim 13, wherein the electronic device is caused to implement obtaining the application information after the application is launched.

* * * * *